(12) United States Patent
Kawase

(10) Patent No.: US 12,362,694 B2
(45) Date of Patent: Jul. 15, 2025

(54) CONVEYANCE SYSTEM

(71) Applicant: Mitsubishi Electric Corporation, Tokyo (JP)

(72) Inventor: Tatsuya Kawase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/863,671

(22) PCT Filed: Aug. 18, 2022

(86) PCT No.: PCT/JP2022/031261
§ 371 (c)(1),
(2) Date: Nov. 7, 2024

(87) PCT Pub. No.: WO2024/038558
PCT Pub. Date: Feb. 22, 2024

(65) Prior Publication Data
US 2025/0112576 A1    Apr. 3, 2025

(51) Int. Cl.
*B65G 47/68* (2006.01)
*B65G 54/02* (2006.01)
*H02P 25/064* (2016.01)

(52) U.S. Cl.
CPC ............ *H02P 25/064* (2016.02); *B65G 54/02* (2013.01)

(58) Field of Classification Search
CPC ....... H02P 25/064; B65G 54/02; B65G 47/68; B07C 3/003
See application file for complete search history.

(56) References Cited

U.S. PATENT DOCUMENTS

| 8,866,429 B2 | 10/2014 | Niizuma |
| 9,050,896 B2 | 6/2015 | Brier et al. |
| 9,812,939 B2 | 11/2017 | Kumazawa et al. |

(Continued)

FOREIGN PATENT DOCUMENTS

| JP | H09-074616 A | 3/1997 |
| JP | H09-208051 A | 8/1997 |

(Continued)

OTHER PUBLICATIONS

International Search Report and Written Opinion mailed on Oct. 25, 2022, received for PCT Application PCT/JP2022/031261, filed on Aug. 18, 2022, 08 pages including English Translation.

(Continued)

*Primary Examiner* — Cortez M Cook
(74) *Attorney, Agent, or Firm* — XSENSUS LLP

(57) ABSTRACT

A conveyance system includes a plurality of conveyance path units constituting a conveyance path on which a conveyance body moves, and each connected to a common direct-current bus. A conveyance path unit that is each of the plurality of conveyance path units includes a drive unit supplied with power from the direct-current bus to thereby generate motive power for moving the conveyance body. Among the plurality of conveyance path units, one or at least one of two or more of the conveyance path units which the conveyance body has not entered executes regenerative power supply for supplying the drive unit with regenerative power generated in the plurality of conveyance path units.

19 Claims, 10 Drawing Sheets

(56) References Cited

U.S. PATENT DOCUMENTS

| | | | |
|---|---|---|---|
| 10,164,555 B1 | 12/2018 | Ozimek | |
| 10,978,969 B2 | 4/2021 | Weber et al. | |
| 11,387,728 B2 | 7/2022 | Kim | |
| 2015/0239015 A1* | 8/2015 | Asari | B65G 47/68 209/606 |
| 2016/0257502 A1* | 9/2016 | Fujihara | B07C 3/003 |

FOREIGN PATENT DOCUMENTS

| | | |
|---|---|---|
| JP | 2005-022321 A | 1/2005 |
| JP | 2017-042029 A | 2/2017 |
| JP | 2019-170153 A | 10/2019 |
| JP | 2019-221131 A | 12/2019 |
| JP | 2021-078348 A | 5/2021 |
| WO | 2010/110013 A1 | 9/2010 |

OTHER PUBLICATIONS

Decision to Grant a Patent mailed on Mar. 7, 2023, received for JP Application 2023-504120, 05 pages including English Translation.

\* cited by examiner

| CONVEYANCE PATH UNIT | CARRIER | REGENERATIVE POWER SUPPLY |
|---|---|---|
| A | PRESENT | NO |
| B | ABSENT | YES |
| C | PRESENT | NO |
| D | PRESENT | NO |
| E | PRESENT | NO |
| F | PRESENT | NO |
| G | ABSENT | YES |
| H | ABSENT | YES |

FIG.6

| CONVEYANCE PATH UNIT | CARRIER | REGENERATIVE POWER SUPPLY |
|---|---|---|
| A | PRESENT | NO |
| B | ABSENT | NO |
| C | PRESENT | NO |
| D | PRESENT | NO |
| E | ABSENT | NO |
| F | ABSENT | YES |
| G | ABSENT | YES |
| H | ABSENT | NO |

CONVEYANCE SYSTEM

CROSS-REFERENCE TO RELATED APPLICATION

The present application is based on PCT filing PCT/JP2022/031261, filed Aug. 18, 2022, the entire contents of which are incorporated herein by reference.

FIELD

The present disclosure relates to a conveyance system that conveys an object.

BACKGROUND

A conveyance system that conveys a workpiece is generally used in a production line in which factory automation is introduced, for example, a production line for assembling industrial products or a production line for packaging food products. In recent years, many conveyance systems have been used in which a conveyance path for conveying workpieces is divided into a plurality of zones, and a carrier on which a workpiece is placed is caused to travel by a control device disposed in each zone. Such a conveyance system is known as one of conveyance systems excellent in terms of production efficiency.

Some conveyance systems use a linear motor that includes a carrier having a magnet and a conveyance path having a plurality of coils. Some conveyance systems using the linear motor control a current flowing through each coil by an inverter circuit such as a full-bridge inverter circuit or a half-bridge inverter circuit. In such a conveyance system, it is important to appropriately process, in the form of consumption or recovery, regenerative power generated in the coils when the carrier decelerates.

Patent Literature 1 discloses a conveyance system that includes a carrier having a magnetic element and a conveyance path having a plurality of magnetic coil assemblies, and recovers regenerative energy in an energy storage assembly provided at one or a plurality of points in the conveyance path.

CITATION LIST

Patent Literature

Patent Literature 1: Japanese Patent Application Laid-open No. 2019-170153

SUMMARY OF INVENTION

Problem to be Solved by the Invention

According to the technique of Patent Literature 1, it is necessary to install the energy storage assembly at each of the points in the conveyance path where the carrier decelerates. In a case where the point at which the carrier decelerates is undefined, the energy storage assembly has to be installed at all points where the carrier may decelerate. The more energy storage assemblies required to be installed, the larger the size of the conveyance system and the higher the production cost of the conveyance system. Therefore, according to the conventional technique of Patent Literature 1, there is a problem that it is difficult to make it possible to appropriately process regenerative power.

The present disclosure has been made in view of the above, and an object thereof is to obtain a conveyance system capable of appropriately processing regenerative power.

Means to Solve the Problem

In order to solve the above-described problem and achieve the object, a conveyance system according to the present disclosure includes a plurality of conveyance path units constituting a conveyance path on which a conveyance body moves, the conveyance path units each being connected to a common direct-current bus. A conveyance path unit that is each of the plurality of conveyance path units includes a drive unit to be supplied with power from the direct-current bus to thereby generate motive power for moving the conveyance body. Among the plurality of conveyance path units, one or at least one of two or more of the conveyance path units which the conveyance body has not entered executes regenerative power supply for supplying regenerative power generated in the plurality of conveyance path units to the drive unit.

Effects of the Invention

The conveyance system according to the present disclosure achieves an effect that it is possible to appropriately process regenerative power.

BRIEF DESCRIPTION OF DRAWINGS

FIG. 6 is a diagram for describing an operation of each conveyance path unit included in the conveyance system according to the second embodiment.

DESCRIPTION OF EMBODIMENTS

Hereinafter, a conveyance system according to each embodiment will be described in detail with reference to the drawings.

First Embodiment

Figure 1:
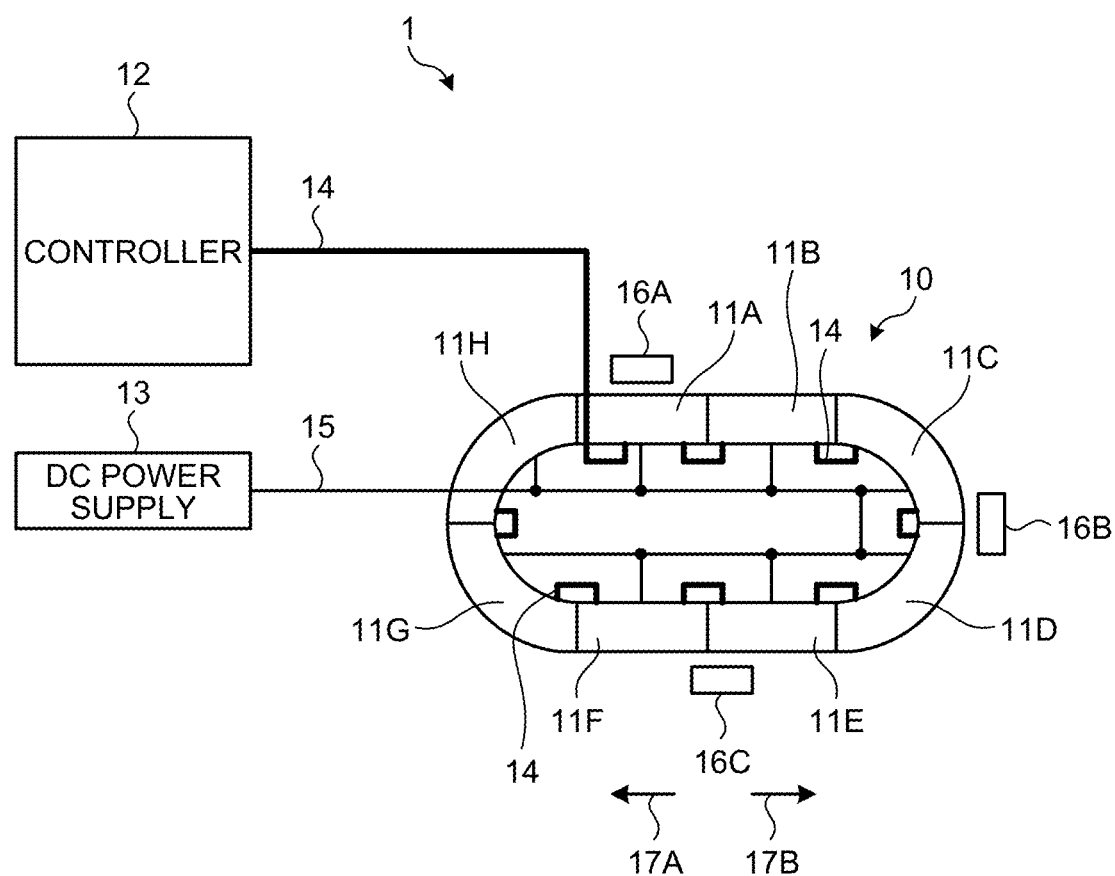
FIG. 1 is a diagram illustrating an exemplary configuration of a conveyance system according to a first embodiment.

FIG. 1 is a diagram illustrating an exemplary configuration of a conveyance system 1 according to a first embodiment. The conveyance system 1 is a system used for conveying an object. In the first embodiment, the conveyance system 1 conveys an object by moving a conveyance body on which the object is placed.

The conveyance system 1 includes a plurality of conveyance path units 11A, 11B, 11C, 11D, 11E, 11F, 11G, and 11H, a controller 12, a direct-current (DC) power supply 13, and carriers 16A, 16B, and 16C. In the following description, the conveyance path units 11A, 11B, 11C, 11D, 11E, 11F, 11G, and 11H are each referred to as a conveyance path unit 11 when not being distinguished from each other.

The plurality of conveyance path units 11 are coupled to each other and constitute a conveyance path 10 on which the conveyance body moves. The plurality of conveyance path units 11 move the conveyance body by applying motive power to the conveyance body. Each of the carriers 16A, 16B, and 16C is a conveyance body. In the following description, the carriers 16A, 16B, and 16C are each referred to as a carrier 16 when not being distinguished from each other.

The conveyance path 10 illustrated in FIG. 1 has an annular shape. That is, the conveyance path 10 illustrated in FIG. 1 is a closed path. The conveyance path 10 of the conveyance system 1 may be an open path. That is, the conveyance path 10 of the conveyance system 1 may be a path having a start point and an end point.

The conveyance path units 11A, 11B, 11E, and 11F are each a linear conveyance path unit 11 constituting a linear path. The conveyance path units 11C, 11D, 11G, and 11H are each a curved conveyance path unit 11 constituting a curved path, and change the traveling direction of the conveyance body. The conveyance path 10 may include only the conveyance path units 11 each constituting a curved path without including the conveyance path units 11 each constituting a linear path. Any shape may be employed as the entire shape of the conveyance path 10.

The carrier 16 is attached to a side surface of the conveyance path 10. The carrier 16 moves along a guide rail provided on the side surface of the conveyance path 10. The carrier 16 moves on the side surface of the conveyance path 10 and stops on the side surface of the conveyance path 10. The conveyance system 1 according to the first embodiment is a moving magnet type linear motor. The carrier 16 may move along a guide rail provided on an upper surface of the conveyance path 10. The carrier 16 includes a permanent magnet constituting a mover, a permanent magnet for a linear scale, and a guide roller that moves on the guide rail by rotation. In FIG. 1, the guide rail, the guide roller, the permanent magnet constituting a mover, and the permanent magnet for a linear scale are not illustrated.

In the example illustrated in FIG. 1, the conveyance system 1 includes eight conveyance path units 11 and three carriers 16. There may be any number of conveyance path units 11 included in the conveyance system 1. That is, there may be any number of conveyance path units 11 constituting the conveyance path 10. The conveyance system 1 is only required to include a plurality of conveyance path units 11. There may be any number of carriers 16 moving on the conveyance path 10. The conveyance system 1 is only required to include one or a plurality of carriers 16.

The conveyance system 1 is not limited to a system including a linear motor, and may be a system including a rotary motor. The conveyance system 1 may be a belt conveyor including a rotary motor and a belt rotated by the rotary motor. The belt conveyor moves a workpiece placed on the belt. The conveyance system 1 may be a roller conveyor including a plurality of rollers and a rotary motor that rotates the rollers. The roller conveyor moves a workpiece placed on the rollers.

The DC power supply 13 is connected to each conveyance path unit 11 via a DC power supply bus 15. The DC power supply 13 is a power supply device or a power supply circuit that outputs a direct-current voltage. The DC power supply 13 supplies power to each conveyance path unit 11. Each conveyance path unit 11 shares the DC power supply 13.

A direct-current bus on a positive side and a direct-current bus on a negative side pass through the DC power supply bus 15. The direct-current bus on the positive side is referred to as a P bus. The direct-current bus on the negative side is referred to as an N bus. The P bus is connected to a positive electrode of the DC power supply 13. The N bus is connected to a negative electrode of the DC power supply 13. Hereinafter, when both the P bus and the N bus are referred to, the buses are referred to as PN buses. Each of the plurality of conveyance path units 11 constituting the conveyance path 10 is connected to a common direct-current bus.

The conveyance system 1 has a configuration in which each conveyance path unit 11 is connected to the DC power supply 13 by a multi-drop connection. The connection form between each conveyance path unit 11 and the DC power supply 13 is not limited to the multi-drop connection, and may be a daisy chain connection. In the example illustrated in FIG. 1, the conveyance system 1 includes one DC power supply 13, but the conveyance system 1 may include two or more DC power supplies 13. That is, a plurality of power supply domains may be configured in the conveyance system 1.

The controller 12 is connected to each conveyance path unit 11 via a data communication line 14. The controller 12 controls each of the plurality of conveyance path units 11. The data communication line 14 includes a line connecting the controller 12 and the conveyance path unit 11A which is one of the plurality of conveyance path units 11, and lines connecting the conveyance path units 11 adjacent to each other. The conveyance system 1 has a configuration in which each conveyance path unit 11 is connected to the controller 12 by a daisy chain connection. A connection form between each conveyance path unit 11 and the controller 12 is not limited to the daisy chain connection. The connection form between each conveyance path unit 11 and the controller 12 may be a star connection in which each conveyance path unit 11 is connected to the controller 12 via a communication hub. Alternatively, the conveyance system 1 may include a plurality of data communication lines 14, and each conveyance path unit 11 and the controller 12 may be directly connected by the data communication line 14.

The controller 12 generates a position command indicating a position to which each carrier 16 is moved, and generates a coil drive command on the basis of the position command. The controller 12 outputs the coil drive command to each conveyance path unit 11. Each conveyance path unit 11 drives a coil of the conveyance path unit 11 in accordance with the coil drive command. The controller 12 controls the movement of each carrier 16 by outputting the coil drive command to each conveyance path unit 11. The coil drive command can correspond to, for example, a current command, a speed command, or a thrust command.

A traveling direction of each carrier 16 is a clockwise direction in FIG. 1 or a counterclockwise direction in FIG. 1. Among the traveling directions, the clockwise direction in FIG. 1 is defined as a forward direction. Among the traveling directions, the counterclockwise direction in FIG. 1 is defined as a reverse direction. An arrow 17A indicates the forward direction. An arrow 17B represents the reverse direction.

A higher-level control device than the controller 12, such as a programmable logic controller, may be connected to the controller 12. The control device outputs a command for sequence control to the controller 12. A human-machine interface may be connected to the controller 12. The human-machine interface receives an input from an operator. In addition, the human-machine interface outputs information indicating the status of the conveyance system 1 by display or the like. The controller 12 may acquire operation information of the carriers 16 from the higher-level control device or the human-machine interface, and generate the position command on the basis of the operation information. The operation information is information indicating a schedule for movement of each of the plurality of carriers 16 on the conveyance path 10.

Next, a configuration of the conveyance path unit 11 will be described. Here, the configuration of the conveyance path unit 11 will be described by taking the linear conveyance path unit 11 as an example. The curved conveyance path unit 11 is different from the linear conveyance path unit 11 in how coils are disposed. The configuration of the curved conveyance path unit 11 is similar to the configuration of the linear conveyance path unit 11 except the difference in how coils are disposed.

Figure 2:
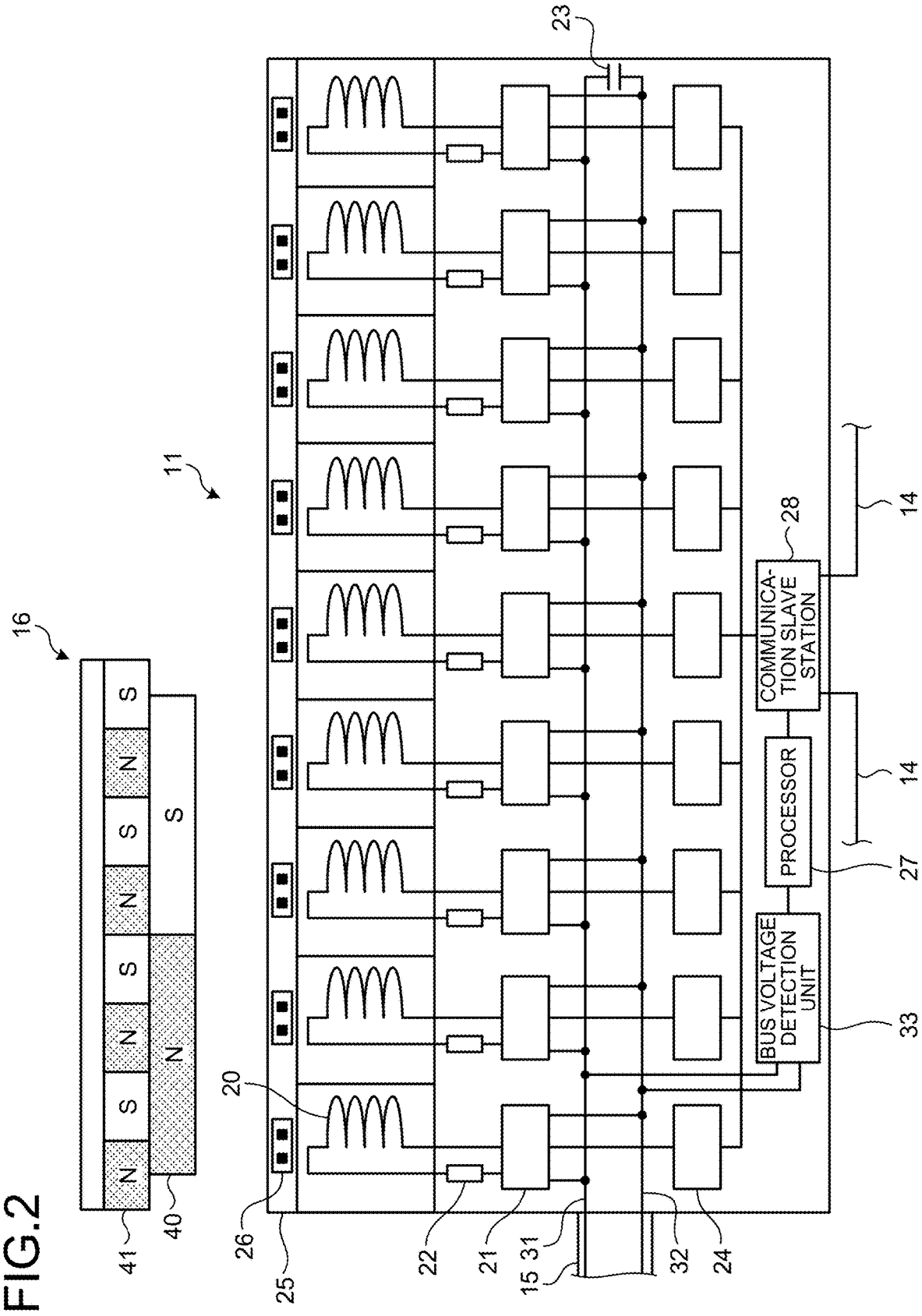
FIG. 2 is a diagram illustrating an exemplary configuration of a conveyance path unit included in the conveyance system according to the first embodiment.

FIG. 2 is a diagram illustrating an exemplary configuration of the conveyance path unit 11 included in the conveyance system 1 according to the first embodiment. FIG. 2 illustrates the conveyance path unit 11 and permanent magnets 40 and 41 included in the carrier 16. The permanent magnet 40 is a permanent magnet constituting a mover. The permanent magnet 41 is a permanent magnet for a linear scale.

The conveyance path unit 11 includes a plurality of coils 20. Each coil 20 functions as a drive unit to be supplied with power from the PN buses to thereby generate motive power. In the example illustrated in FIG. 2, the conveyance path unit 11 includes nine coils 20. There may be any number of coils 20 included in the conveyance path unit 11. In the linear conveyance path unit 11, the plurality of coils 20 are arranged in a direction of the line. In the curved conveyance path unit 11, the plurality of coils 20 are arranged in a direction of the curve.

An inverter circuit 21 is connected to each of the coils 20 of the conveyance path unit 11. The inverter circuit 21 includes switching elements, and supplies the coil 20 with power having undergone power conversion by switching of the switching elements. The switching elements are not illustrated. The inverter circuit 21 controls a current flowing through the coil 20. The inverter circuit 21 is a single-phase full-bridge inverter circuit or a single-phase half-bridge inverter circuit. The inverter circuit 21 may be a three-phase inverter circuit connected to three coils 20. Each of the coils 20 of the conveyance path unit 11 includes not only a pure inductance component but also coil resistance.

Each inverter circuit 21 of the conveyance path unit 11 is connected between a P bus 31 which is positive wiring of the DC power supply bus 15 and an N bus 32 which is negative wiring of the DC power supply bus 15. Each inverter circuit 21 converts direct-current power from the PN buses into alternating-current power and supplies the alternating-current power to the coil 20. The inverter circuit 21 performs power conversion from direct-current power to alternating-current power by switching of the switching elements.

With the supply of the power converted by the inverter circuit 21, the coil 20 generates an electromagnetic force serving as motive power for moving the carrier 16. A current sensor 22 is connected to each coil 20 of the conveyance path unit 11. The current sensor 22 detects a coil actual current value which is a current value of a current flowing through the coil 20. In the conveyance path unit 11, a capacitor 23 which is an electrolytic capacitor is connected between the P bus 31 and the N bus 32.

To the inverter circuit 21, a current controller 24 that controls the inverter circuit 21 is connected. The current controller 24 calculates a voltage value of a voltage to be applied to the coil 20 on the basis of a current command value of the current flowing through the coil 20 and the coil actual current value detected by the current sensor 22. The current controller 24 transmits, to the inverter circuit 21, a pulse width modulation (PWM) signal obtained by comparing the calculated voltage value with a triangular waveform. The current controller 24 transmits the PWM signal to the inverter circuit 21 to thereby cause the inverter circuit 21 to perform switching. Consequently, the current controller 24 applies, to the coil 20, a voltage for causing a current of a desired current value to flow through the coil 20. The current controller 24 may calculate the voltage value of the voltage to be applied to the coil 20 by performing proportional integral differential (PID) control of the voltage to be applied to the coil 20 on the basis of a deviation between the current command value and the coil actual current value.

The conveyance path unit 11 includes a linear scale 25, a processor 27, and a bus voltage detection unit 33. The bus voltage detection unit 33 detects a bus voltage. The bus voltage is a voltage of the PN buses which are direct-current buses, that is, a voltage between the P bus 31 and the N bus 32. The bus voltage detection unit 33 outputs a detection result of the bus voltage to the processor 27.

The linear scale 25 is a sensing unit to sense a position of the carrier 16 on the conveyance path unit 11. The linear scale 25 is provided on the conveyance path 10 by the plurality of conveyance path units 11 connecting to each other to form the conveyance path 10. The processor 27 is a central processing unit (CPU). The processor 27 may be an arithmetic device, a processing device, a microprocessor, a microcomputer, or a digital signal processor (DSP).

The linear scale 25 includes a plurality of position sensors 26. Each position sensor 26 is a sensor that detects a magnetic field, such as a Hall sensor or a magnetoresistive sensor. Each position sensor 26 detects a magnetic field of the permanent magnet 40 or a magnetic field of the permanent magnet 41. Here, the position sensor 26 is a Hall sensor on which two Hall elements are mounted. An interval between the two Hall elements is an interval corresponding to half of a magnetic pole pitch of the permanent magnet 41.

Each Hall element converts the magnetic field into an electrical signal and outputs the electrical signal. The electrical signal output from each Hall element changes with the movement of the carrier 16. The electrical signal output from one Hall element has a waveform of a sin wave. The electrical signal output from the other Hall element has a waveform of a cos wave.

An analog to digital (AD) converter included in the processor 27 detects the sin wave and the cos wave. The processor 27 detects the position of the carrier 16 with respect to the position sensor 26 by calculating arctan on the basis of information on the sin wave and information on the cos wave. Consequently, the processor 27 acquires position information indicating the position of the carrier 16.

In addition, the processor 27 acquires the detection result of the bus voltage from the bus voltage detection unit 33. The processor 27 controls the start of regenerative power supply by the inverter circuit 21 and the stop of regenerative power supply by the inverter circuit 21. The regenerative power supply will be described later.

The conveyance path unit 11 includes a communication slave station 28. The communication slave station 28 is a communication slave station on a side of the conveyance path unit 11. The data communication line 14 is connected to the communication slave station 28. In a case where each conveyance path unit 11 and the controller 12 are connected by the daisy chain connection, the communication slave station 28 is configured to be able to connect two data communication lines 14. For each of the plurality of coils 20 included in the conveyance path unit 11, the communication slave station 28 receives, from the controller 12, a current command indicating a current command value of a current to be caused to flow through the coil 20. The communication slave station 28 acquires the position information acquired by the processor 27 on the basis of an output from each of the plurality of position sensors 26 included in the linear scale 25. The communication slave station 28 transmits the acquired position information to the controller 12.

The communication slave station 28 performs, for example, fixed-cycle communication in which a current command is received and position information is transmitted in a fixed cycle. The communication slave station 28 may aperiodically perform the reception of the current command and the transmission of the position information instead of the fixed-cycle communication.

As described above, the conveyance path unit 11 mainly has a function of performing energization control of the coils 20 and a function of acquiring position information. All of the plurality of conveyance path units 11 constituting the conveyance path 10 similarly perform energization control of the coils 20 and similarly acquire position information.

Next, an operation of the conveyance system 1 performed by sharing the PN buses will be described. For example, in the conveyance path units 11 illustrated in FIG. 1, suppose that the carrier 16A and the carrier 16B are in a power running state, for example, a state of performing acceleration. In addition, in the conveyance path units 11 illustrated in FIG. 1, suppose that the carrier 16C is in a regenerative state, for example, a state of performing deceleration. In such states, in a case where regenerative power of the carrier 16C is smaller than the sum of power running power of the carrier 16A and power running power of the carrier 16B, the regenerative power is consumed as the power running power, and thus, an increase in the bus voltage due to generation of the regenerative power is prevented.

On the other hand, in a case where all of the carrier 16A, the carrier 16B, and the carrier 16C are in the regenerative state, the regenerative power generated in each of the carriers 16A, 16B, and 16C is not consumed, so that the bus voltage increases. Besides, also in a case where the carrier 16 in the power running state and the carrier 16 in the regenerative state are included in the carriers 16A, 16B, and 16C, and the regenerative power by the carrier 16 in the regenerative state is larger than the power running power by the carrier 16 in the power running state, the bus voltage increases. An excessive increase in the bus voltage adversely affects the life of the capacitor 23 or leads to breakage of the capacitor 23. Therefore, the conveyance system 1 according to the first embodiment executes regenerative control to consume regenerative power in the plurality of conveyance path units 11 as described below.

Here, the regenerative control executed by the conveyance system 1 will be described. In the conveyance system 1, among the plurality of conveyance path units 11, one or two or more conveyance path units 11 which the carrier 16 has not entered execute regenerative power supply for supplying the coils 20 with regenerative power generated in the plurality of conveyance path units 11. Among the plurality of conveyance path units 11, one or two or more conveyance path units 11 which the carrier 16 has not entered execute the regenerative power supply when the bus voltage becomes equal to or higher than a preset first voltage threshold. The first voltage threshold is a value of the bus voltage serving as reference for starting the regenerative control. The first voltage threshold is set in advance in each conveyance path unit 11 of the conveyance system 1.

The conveyance path unit 11 that is executing the regenerative power supply stops the regenerative power supply when the bus voltage becomes equal to or lower than a second voltage threshold. The second voltage threshold is a value of the bus voltage serving as reference for stopping the regenerative control. The second voltage threshold is set in advance in each conveyance path unit 11 of the conveyance system 1. When the carrier 16 has entered the conveyance path unit 11 that is executing the regenerative power supply, the conveyance path unit 11 stops executing the regenerative power supply. As described above, the conveyance path unit 11 stops the regenerative power supply when the bus voltage becomes equal to or lower than the second voltage threshold or when the carrier 16 enters the conveyance path unit 11.

Here, a case is taken as an example where in the conveyance path units 11 illustrated in FIG. 1, the carrier 16A starts deceleration when the carrier 16B and the carrier 16C are at a stop. The carrier 16B is at a stop across the conveyance path unit 11C and the conveyance path unit 11D. The carrier 16C is at a stop across the conveyance path unit 11E and the conveyance path unit 11F. The carrier 16A starts deceleration on the conveyance path unit 11A.

Figure 3:
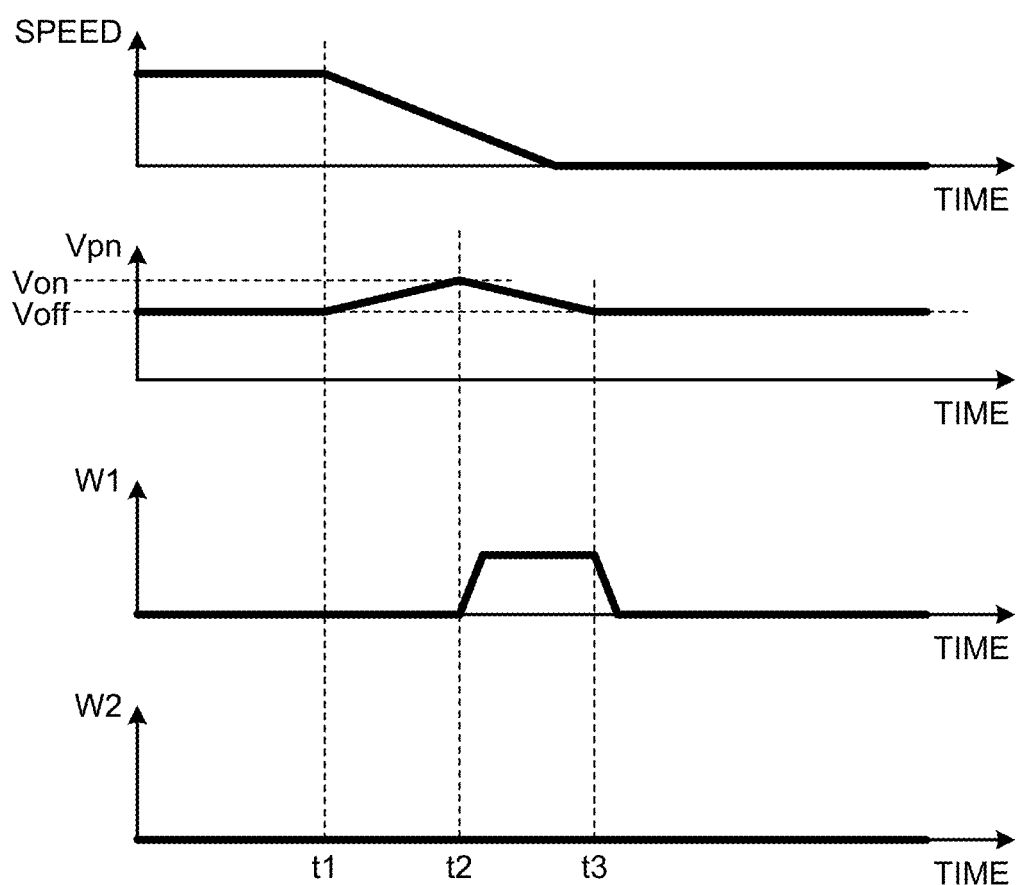
FIG. 3 is a diagram for describing regenerative control executed by the conveyance system according to the first embodiment.

FIG. 3 is a diagram for describing the regenerative control executed by the conveyance system 1 according to the first embodiment. FIG. 3 illustrates a time chart of a speed of the carrier 16 on the conveyance path unit 11 in the regenerative state, a bus voltage Vpn, regenerative power W1, and regenerative power W2. The regenerative power W1 is regenerative power supplied to the coils 20 of the conveyance path units 11 on which no carrier 16 is present. The regenerative power W2 is regenerative power supplied to the coils 20 of the conveyance path units 11 on which the carriers 16 are present. The speed of the carrier 16 illustrated in FIG. 3 is the speed of the carrier 16A. The conveyance path units 11 on which the carriers 16 are present are the conveyance path units 11A, 11C, 11D, 11E, and 11F. The conveyance path units 11 on which no carrier 16 is present are the conveyance path units 11B, 11G, and 11H.

A voltage value Von is a first voltage threshold. A voltage value Voff is a second voltage threshold. Here, voltage values Von set in the respective conveyance path units 11 of the conveyance system 1 are the same. Voltage values Voff set in the respective conveyance path units 11 of the conveyance system 1 are the same.

When the carrier 16A starts deceleration at time t1, regenerative power is generated in the coils 20 of the conveyance path unit 11A. When regenerative power is generated in the coils 20 of the conveyance path unit 11A, the bus voltage Vpn starts to rise from time t1. The processor 27 of each conveyance path unit 11 constantly monitors a result of detection of the bus voltage Vpn by the bus voltage detection unit 33.

Suppose that, as illustrated in FIG. 3, the bus voltage Vpn reaches the voltage value Von at time t2. The processor 27 of each of the conveyance path units 11B, 11G, and 11H on which no carrier 16 is present starts the regenerative power supply by the inverter circuit 21. The regenerative power W1 supplied to the coils 20 of each of the conveyance path units 11B, 11G, and 11H starts to rise from zero at time t2.

In a case where the inverter circuit 21 executes the regenerative power supply, the current controller 24 performs current control so that a current corresponding to the rated current of the coil 20 continues to flow through the coil 20. The current flowing through the coil 20 is converted into heat by the coil resistance. The current is converted into heat by the coil 20, and thereby the regenerative power W1 is consumed by the coil 20.

The regenerative power W1 is consumed, and thereby the bus voltage Vpn gradually decreases from the voltage value Von. Suppose that, as illustrated in FIG. 3, the bus voltage Vpn decreases from the voltage value Von at time t2, and the bus voltage Vpn reaches the voltage value Voff at time t3. The processor 27 of each of the conveyance path units 11B, 11G, and 11H stops the regenerative power supply by the inverter circuits 21. In the example illustrated in FIG. 3, the regenerative power W1 starts to rise from time t2, then is maintained at a constant amount, and starts to decrease from time t3. Thereafter, the regenerative power W1 becomes zero.

In the conveyance path units 11A, 11C, 11D, 11E, and 11F on which the carriers 16 are present, movement of the carriers 16 and stop of the carriers 16 are performed. In the time series illustrated in FIG. 3, the regenerative power W2 supplied to the coils 20 of each of the conveyance path units 11A, 11C, 11D, 11E, and 11F remains at zero.

Figures 4, 5:
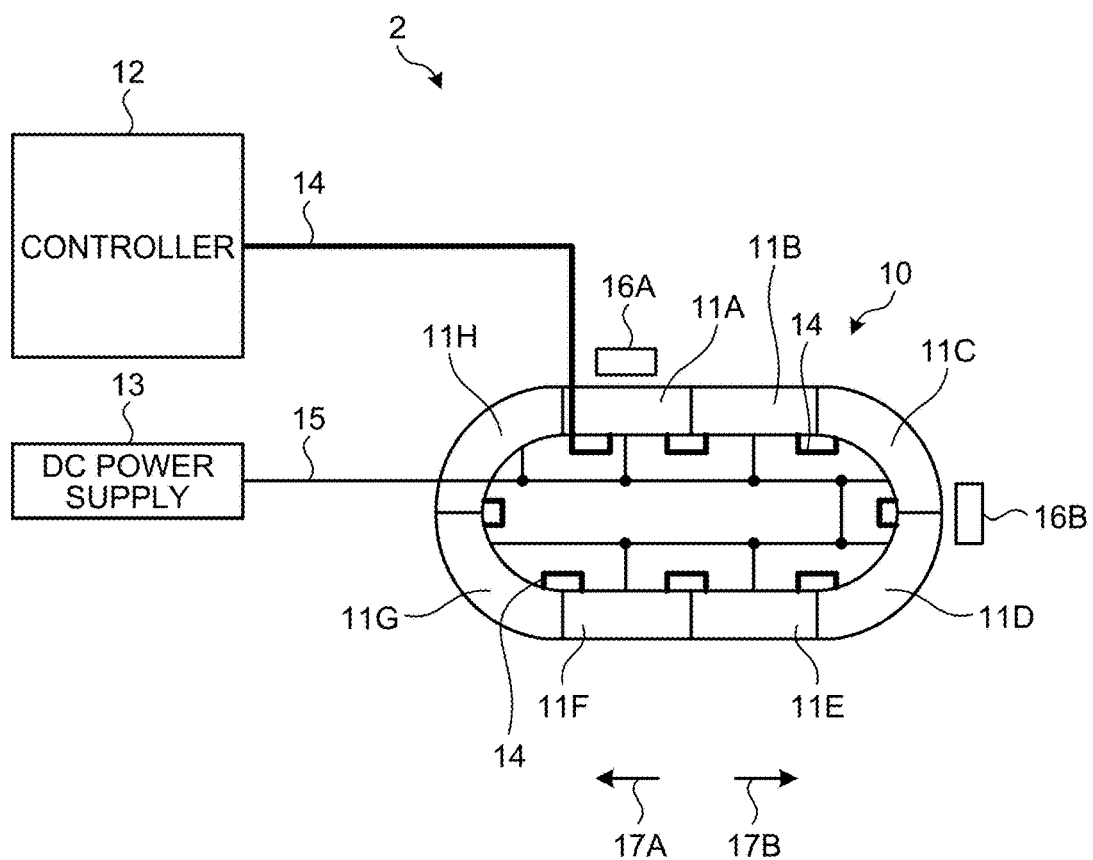
FIG. 4 is a diagram for describing an operation of each conveyance path unit included in the conveyance system according to the first embodiment.
FIG. 5 is a diagram illustrating an exemplary configuration of a conveyance system according to a second embodiment.

FIG. 4 is a diagram for describing an operation of each conveyance path unit 11 included in the conveyance system 1 according to the first embodiment. FIG. 4 illustrates a table summarizing the presence or absence of the carrier 16 of each conveyance path unit 11 and whether to execute the regenerative power supply of each conveyance path unit 11 in the case of the above example. In FIG. 4, "A", "B", . . . , and "H" in the field of "conveyance path unit" represent the conveyance path unit 11A, the conveyance path unit 11B, . . . , and the conveyance path unit 11H, respectively. "Yes" in the field of "regenerative power supply" indicates that the regenerative power supply is executed. "No" in the field of "regenerative power supply" indicates that the regenerative power supply is not executed.

In a case where the carrier 16 is not sensed by the linear scale 25, the processor 27 of the conveyance path unit 11 recognizes that the carrier 16 has not entered the conveyance path unit 11. In a case where the carrier 16 is sensed by the linear scale 25, the processor 27 recognizes that the carrier 16 has entered the conveyance path unit 11. As illustrated in FIG. 4, each of the conveyance path units 11B, 11G, and 11H that the carrier 16 has not entered executes the regenerative power supply. Each of the conveyance path units 11A, 11C, 11D, 11E, and 11F that the carrier 16 has entered does not execute the regenerative power supply.

The conveyance system 1 prevents the bus voltage Vpn from excessively rising beyond the voltage value Von by the execution of the regenerative power supply in the conveyance path units 11 that the carrier 16 has not entered. When the bus voltage Vpn decreases to the voltage value Voff in the conveyance path units 11 that perform the regenerative power supply, the conveyance system 1 stops the regenerative power supply of each conveyance path unit 11. The conveyance system 1 consumes the regenerative power generated in the plurality of conveyance path units 11 by such regenerative control. The conveyance system 1 can prevent an excessive rise in the bus voltage Vpn.

In the above description, the voltage values Von set in the respective conveyance path units 11 of the conveyance system 1 are the same, but the plurality of conveyance path units 11 may include conveyance path units 11 in which different voltage values Von are set. Any voltage value Von can be individually set for each of the plurality of conveyance path units 11.

In the above description, the voltage values Voff set in the respective conveyance path units 11 of the conveyance system 1 are the same, but the plurality of conveyance path units 11 may include conveyance path units 11 in which different voltage values Voff are set. Any voltage value Voff can be individually set for each of the plurality of conveyance path units 11.

As described above, in the conveyance system 1, at least one of the first voltage threshold and the second voltage threshold may be individually set for each of the plurality of conveyance path units 11. The conveyance system 1 can freely set at least one of the first voltage threshold and the second voltage threshold depending on a mode of regenerative power supply desired to be achieved by the conveyance path unit 11.

The linear conveyance path units 11 and the curved conveyance path units 11 are different in the number of phases of the coils 20, resistance values of the coils 20, the size of the casing of the conveyance path unit 11, or the like. Therefore, for example, at least one of the first voltage threshold and the second voltage threshold may be set to different values between the linear conveyance path units 11 and the curved conveyance path units 11. When at least one of the first voltage threshold and the second voltage threshold is individually set for each of the plurality of conveyance path units 11, the conveyance system 1 can provide regenerative power consumption suitable for the configuration of each conveyance path unit 11.

In the conveyance path unit 11 in which the number of phases of the coils 20 is large, the first voltage threshold may be made lower than that in the conveyance path unit 11 in which the number of phases of the coils 20 is small. Consequently, the conveyance system 1 can cause the conveyance path unit 11 including the coils 20 having a large number of phases as a priority to execute the regenerative power supply. It can also be said that the number of phases of the coils 20 is the number of coils 20 provided in one conveyance path unit 11. FIG. 2 illustrates the conveyance path unit 11 in which the number of phases of the coils 20 is nine.

In each conveyance path unit 11 of the conveyance system 1, a power threshold which is an upper limit of the regenerative power W1 allowed to be supplied to each coil 20 is set in advance. Here, power thresholds set in the respective conveyance path units 11 of the conveyance system 1 are the same. When power supplied to each coil 20 of the conveyance path unit 11 that is executing the regenerative power supply exceeds a preset power threshold, the conveyance path unit 11 stops executing the regenerative power supply. As the power threshold, for example, $I_{rate}^2 \times R_{coil}$ can be set in which $I_{rate}$ represents the rated current of the coil 20, and $R_{coil}$ represents the coil resistance of the coil 20. A value obtained from an electronic thermal protection curve of each coil 20 may be set as the power threshold. The power threshold is not limited to these values, and any value can be set. By stopping the regenerative power supply in the conveyance path unit 11 in which the power supplied to each coil 20 exceeds the power threshold, the conveyance system 1 can prevent the regenerative power from not being consumed due to overheating of the coil 20.

In the above description, the power thresholds set in the respective conveyance path units 11 of the conveyance system 1 are the same, but the plurality of conveyance path units 11 may include conveyance path units 11 in which different power thresholds are set. Any power threshold can be individually set for each of the plurality of conveyance path units 11. The conveyance system 1 can freely set the power threshold depending on a mode of regenerative power supply desired to be achieved by the conveyance path unit 11. For example, the power thresholds may be set to different values between the linear conveyance path units 11 and the curved conveyance path units 11. When the power threshold is individually set for each of the plurality of conveyance path units 11, the conveyance system 1 can provide regenerative power consumption suitable for the configuration of each conveyance path unit 11.

Suppose that, in the conveyance system 1, for example, the carrier 16A illustrated in FIG. 1 moves from the conveyance path unit 11A to the conveyance path unit 11H during deceleration. When the entirety of the carrier 16A enters the conveyance path unit 11H and the carrier 16A is not present on the conveyance path unit 11A, the conveyance path unit 11A starts the regenerative power supply. Alternatively, the conveyance path unit 11H on which the carrier 16 has not been present before the entering of the carrier 16A stops the regenerative power supply when the carrier 16A starts to enter the conveyance path unit 11H. As described above, the conveyance path units 11A and 11H perform switching between the execution of the regenerative power supply and the stop of the regenerative power supply in response to the movement of the carrier 16A. The conveyance path units 11 other than the conveyance path units 11A and 11H also perform switching between the execution of the regenerative power supply and the stop of the regenerative power supply in response to the movement of the carriers 16B and 16C. The conveyance system 1 performs switching, in response to the movement of the carriers 16, of the conveyance path units 11 that execute the regenerative power supply, and thereby being able to consume the regenerative power generated in the plurality of conveyance path units 11 while continuing the movement of the carriers 16.

In the regenerative power supply, the inverter circuit 21 operates at a switching frequency lower than a switching frequency set when motive power is applied to the carrier 16. In other words, regarding frequencies at which the inverter circuit 21 operates, the switching frequency at which the switching by the inverter circuit 21 is performed in a case of executing the regenerative power supply is lower than the switching frequency at which the switching by the inverter circuit 21 is performed in a case of applying motive power to the carrier 16. Consequently, the conveyance path unit 11 can reduce noise caused by switching by the inverter circuit 21 when executing the regenerative power supply.

According to the first embodiment, in the conveyance system 1, among the plurality of conveyance path units 11, one or two or more conveyance path units 11 that the conveyance body has not entered execute the regenerative power supply. The conveyance system 1 can consume the regenerative power even when a point at which the conveyance body decelerates is indefinite. Consequently, the conveyance system 1 achieves an effect that it is possible to appropriately process the regenerative power.

Second Embodiment

In a second embodiment, an example will be described in which among the conveyance path units 11 on which no carrier 16 is present, the conveyance path units 11 adjacent to the conveyance path units 11 on which the carriers 16 are present are excluded from the conveyance path units 11 that execute regenerative power supply. In the second embodiment, when the carrier 16 moving on a certain conveyance path unit 11 enters the conveyance path unit 11 adjacent thereto in a communication cycle, the carrier 16 can be smoothly moved. The communication cycle is a cycle of communication between the controller 12 and the conveyance path units 11. In the second embodiment, the same components as those in the first embodiment are denoted by the same reference numerals as those therein, and configurations different from those in the first embodiment will mainly be described.

FIG. 5 is a diagram illustrating an exemplary configuration of a conveyance system 2 according to the second embodiment. In the conveyance system 2, processes by the controller 12 are different from those in the first embodiment. The configuration of the conveyance system 2 is similar to the configuration of the conveyance system 1 illustrated in FIG. 1. The conveyance path units 11 each have a configuration similar to the configuration illustrated in FIG. 2.

In the example illustrated in FIG. 5, the conveyance system 2 includes eight conveyance path units 11 and two carriers 16. There may be any number of conveyance path units 11 included in the conveyance system 2. That is, there may be any number of conveyance path units 11 constituting the conveyance path 10. The conveyance system 2 is only required to include a plurality of conveyance path units 11. There may be any number of carriers 16 moving on the conveyance path 10. The conveyance system 2 is only required to include one or a plurality of carriers 16.

The communication slave station 28 of each conveyance path unit 11 acquires the position information acquired by the processor 27 on the basis of an output from each of the plurality of position sensors 26 included in the linear scale 25. The communication slave station 28 transmits the acquired position information to the controller 12 via the data communication line 14.

The controller 12 receives the position information transmitted from the communication slave stations 28 of the conveyance path units 11. The controller 12 combines the position information from the communication slave stations 28 of the conveyance path units 11 to acquire position information indicating the position of each carrier 16 on the conveyance path 10. On the basis of the position information indicating the position of each carrier 16 on the conveyance path 10, the controller 12 determines the conveyance path units 11 to execute the regenerative power supply and the conveyance path units 11 to stop the regenerative power supply.

The plurality of conveyance path units 11 includes a first conveyance path unit and second conveyance path units. The controller 12 excludes the first conveyance path unit and the second conveyance path units, from the conveyance path units 11 to execute the regenerative power supply. The plurality of conveyance path units 11 includes the conveyance path units other than the first conveyance path unit and the second conveyance path units, and the controller 12 determines the other conveyance path units to be the conveyance path units 11 to execute the regenerative power supply. The first conveyance path unit is the conveyance path unit 11 on which the carrier 16 as a conveyance body is present. The second conveyance path units are M conveyance path units 11 and N conveyance path units 11. The M conveyance path units 11 are located adjacent to the first conveyance path unit in a first direction along the conveyance path 10, and the N conveyance path units 11 are located adjacent to the first conveyance path unit in a second direction. The second direction, which is a direction along the conveyance path 10, is opposite to the first direction. The first direction is a forward direction indicated by the arrow 17A. The second direction is a reverse direction indicated by the arrow 17B. Each of M and N is any integer of 1 or more. In the second embodiment, of the conveyance path 10, one or at least one of two or more conveyance path units 11 that the carrier 16 has not entered executes the regenerative power supply.

Next, an operation of the conveyance system 2 when the regenerative power supply is executed will be described. Here, the operation of each conveyance path unit 11 will be described by taking a case where the conveyance system 2 is in a state illustrated in FIG. 5 as an example. When the conveyance system 2 is in the state illustrated in FIG. 5, the carrier 16A is present on the conveyance path unit 11A. The carrier 16B is present across the conveyance path unit 11C and the conveyance path unit 11D.

FIG. 6 is a diagram for describing the operation of each conveyance path unit 11 included in the conveyance system 2 according to the second embodiment. The controller 12 recognizes the first conveyance path units from the acquired position information. In the example illustrated in FIG. 5, the conveyance path unit 11A on which the carrier 16A is present and the conveyance path units 11C and 11D on which the carrier 16B is present are the first conveyance path units.

Next, the controller 12 recognizes the second conveyance path units on the basis of the recognized first conveyance path units. Here, M=1 and N=1 are given. In the example illustrated in FIG. 5, each of the conveyance path units 11B, 11E, and 11H is the second conveyance path unit. The controller 12 excludes, from the conveyance path units 11 that execute the regenerative power supply, the conveyance path units 11A, 11C, and 11D which are the first conveyance path units, and the conveyance path units 11B, 11E, and 11H which are the second conveyance path units. The controller 12 transmits an instruction to stop the regenerative power supply to each of the conveyance path units 11A, 11B, 11C, 11D, 11E, and 11H. The instruction to stop the regenerative power supply is, for example, a signal in which a flag indicating the execution of the regenerative power supply is turned off.

Next, the controller 12 recognizes the conveyance path units 11 other than the first conveyance path units and the second conveyance path units among the plurality of conveyance path units 11 included in the conveyance system 2. In the example illustrated in FIG. 5, each of the conveyance path units 11F and 11G is the conveyance path unit 11 other than the first conveyance path units and the second conveyance path units. The controller 12 determines each of the conveyance path units 11F and 11G as the conveyance path unit 11 that executes the regenerative power supply. The controller 12 transmits an instruction to execute the regenerative power supply to each of the conveyance path units 11F and 11G. The instruction to execute the regenerative power supply is, for example, a signal in which the flag indicating the execution of the regenerative power supply is turned on.

The communication slave station 28 of each of the conveyance path units 11A, 11B, 11C, 11D, 11E, and 11H receives the instruction to stop the regenerative power supply sent from the controller 12. Each of the conveyance path units 11A, 11B, 11C, 11D, 11E, and 11H enters a state of not executing the regenerative power supply in accordance with the instruction to stop the regenerative power supply. Each of the conveyance path units 11A, 11B, 11C, 11D, 11E, and 11H performs a normal operation for applying motive power to the carrier 16.

The communication slave station 28 of each of the conveyance path units 11F and 11G receives the instruction to execute the regenerative power supply sent from the controller 12. Each of the conveyance path units 11F and 11G executes the regenerative power supply in accordance with the instruction to execute the regenerative power supply.

M defined as the number of second conveyance path units located adjacent to the first conveyance path unit in the first direction, and N defined as the number of second conveyance path units located adjacent to the first conveyance path unit in the second direction are set in advance. At least one of M and N may be calculated on the basis of the speed of the carrier 16 on the conveyance path 10.

Here, an example of a method for calculating M and N on the basis of the speed of the carrier 16 on the conveyance path 10 will be described. Here, a path length of the conveyance path unit 11 is denoted by L, a maximum speed of the carrier 16 is denoted by V max, and a communication cycle of communication between the controller 12 and the conveyance path unit 11 is denoted by Tcyc. Each of M and N is obtained by rounding up the fractional portion of L/(V max×Tcyc).

As described above, in the second embodiment, the conveyance system 2 excludes, from the conveyance path units 11 that execute the regenerative power supply, not only the first conveyance path units in each of which the carrier 16 is present but also the second conveyance path units adjacent to the first conveyance path units. When the carrier 16 moving on the first conveyance path unit enters the second conveyance path unit adjacent thereto, the carrier 16 enters the second conveyance path unit that is performing the normal operation for applying motive power to the carrier 16. Consequently, in the conveyance system 2, no carrier 16 enters the conveyance path unit 11 that is executing the regenerative power supply in the communication cycle, and therefore the carrier 16 can be smoothly moved in a portion where the conveyance path units 11 are adjacent to each other.

In the above description, M and N are any integers of 1 or more, but at least one of M and N may be zero. That is, the second conveyance path units are only required to be at least one of the following: one or two or more conveyance path units 11 located adjacent to the first conveyance path unit in the first direction, and one or two or more conveyance path units 11 located adjacent to the first conveyance path unit in the second direction. The conveyance system 2 may perform switching of one of M and N between zero and an integer of 1 or more for each communication cycle on the basis of the traveling direction of the carriers 16 for each communication cycle.

The controller 12 may exclude, from the conveyance path units 11 that execute the regenerative power supply, the first conveyance path unit as the conveyance path unit 11 on which the conveyance body is present and the second conveyance path unit as one or two or more conveyance path units 11 located adjacent to the first conveyance path unit in the traveling direction of the conveyance body on the conveyance path 10, among the plurality of conveyance path units 11. The second conveyance path unit located adjacent to the first conveyance path unit ahead of the traveling direction performs the normal operation for applying motive power to the carrier 16. The conveyance system 2 can smoothly move the carrier 16 in a portion where the conveyance path units 11 are adjacent to each other. Also in that case, the number of second conveyance path units may be calculated on the basis of the speed of the carrier 16 on the conveyance path 10.

According to the second embodiment, the conveyance system 2 excludes the first conveyance path unit and the second conveyance path units from the conveyance path units 11 that execute the regenerative power supply, thereby executing the normal operation for applying motive power to the carrier 16 in the first conveyance path unit and the second conveyance path units. Consequently, the conveyance system 2 can smoothly move the carrier 16. In addition, the conveyance system 2 executes the regenerative power supply in the conveyance path units 11 other than the first conveyance path unit and the second conveyance path units among the plurality of conveyance path units 11. Consequently, the conveyance system 2 can appropriately process regenerative power.

Figure 7:
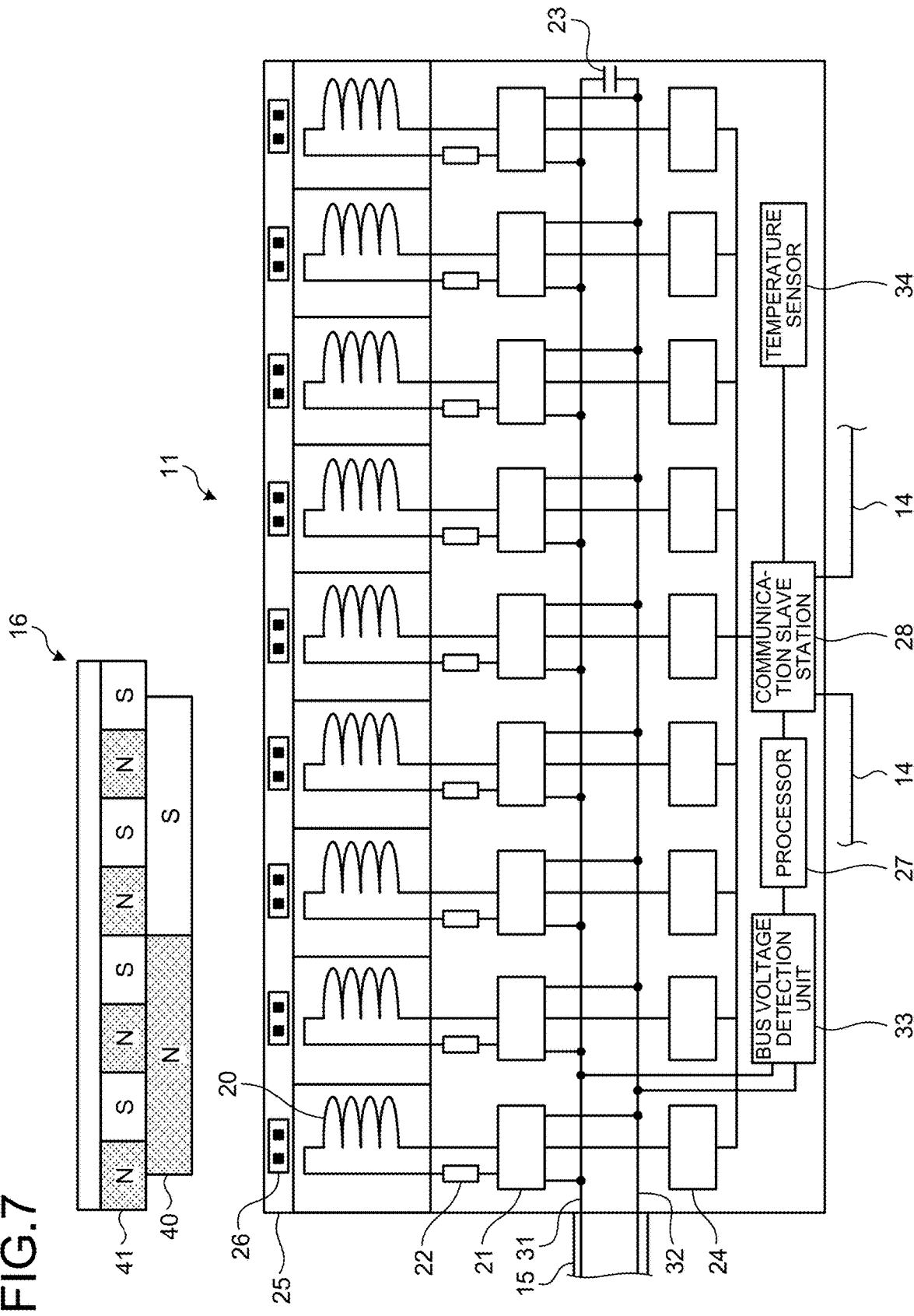
FIG. 7 is a diagram illustrating an exemplary configuration of the conveyance path unit according to a modification of the second embodiment.

FIG. 7 is a diagram illustrating an exemplary configuration of the conveyance path unit 11 according to a modification of the second embodiment. The conveyance path unit 11 according to the modification of the second embodiment includes a temperature sensor 34. The controller 12 determines the conveyance path unit 11 to execute the regenerative power supply, on the basis of a result of detection of temperature by the temperature sensor 34 of each of the plurality of conveyance path units 11.

In each of the conveyance path units 11 that execute the regenerative power supply, the temperature inside the conveyance path unit 11 rises due to the consumption of regenerative power in the coils 20. The controller 12 compares temperatures of the respective conveyance path units 11 of the conveyance system 2. The controller 12 determines, as the conveyance path units 11 that execute the regenerative power supply, one or two or more conveyance path units 11 in ascending order of temperature among the plurality of conveyance path units 11. Consequently, the conveyance system 2 can equalize the temperatures of respective conveyance path units 11. By equalizing the temperatures of respective conveyance path units 11, it is possible to prolong the life of a component of each conveyance path unit 11 that deteriorates by the influence of the temperature. The controller 12 may determine in advance a temperature threshold to be compared with the result of the detection of the temperature by the temperature sensor 34 of each of the plurality of conveyance path units 11, and determine, as the conveyance path units 11 that execute the regenerative power supply, one or two or more conveyance path units 11 in which the result of the detection of the temperature by the temperature sensor 34 is equal to or lower than the temperature threshold.

Third Embodiment

In a third embodiment, an example will be described in which machine learning is applied to generation of a position command to be output to each conveyance path unit 11 by the controller 12. From the operation information of each carrier 16, the controller 12 generates a position command that increases the number of conveyance path units 11 that execute regenerative power supply on the basis of a learned model.

For example, suppose that operation information is acquired which indicates that the carrier 16 is caused to reach a target position located 3 m ahead of a current position two seconds after a certain point of time. In that case, any pattern can be taken as a pattern of a position command to move the carrier 16. One possible pattern is a pattern in which the carrier 16 is moved by trapezoidal acceleration/deceleration between the start point and the end point of the two seconds. Examples of other patterns include a pattern in which the carrier 16 is moved by trapezoidal acceleration/deceleration for one second from the start point and the carrier 16 is stopped for the remaining one second, and a pattern in which the carrier 16 is stopped for one second from the start point and the carrier 16 is moved by trapezoidal acceleration/deceleration for the remaining one second. There are an infinite number of patterns that can be taken as the pattern of the position command.

The conveyance system 2 can increase the number of conveyance path units 11 that execute the regenerative power supply in each control cycle by appropriately setting the pattern of the position command for each carrier 16. That is, in the conveyance system 2, if the number of conveyance path units 11 that execute the regenerative power supply can be increased, regenerative power consumed by one conveyance path unit 11 can be reduced, and thus an excessive temperature rise of the conveyance path unit 11 can be prevented. In the third embodiment, a position command that increases the number of conveyance path units 11 that execute the regenerative power supply is derived by a machine learning method.

The configuration of the conveyance system 2 according to the third embodiment is similar to the configuration of the conveyance system 2 illustrated in FIG. 5. The controller 12 of the conveyance system 2 according to the third embodiment acquires position information indicating the position of each carrier 16 on the conveyance path 10 similarly to the case of the second embodiment. The third embodiment is different from the second embodiment in that components for machine learning are added to the controller 12.

Figure 8:
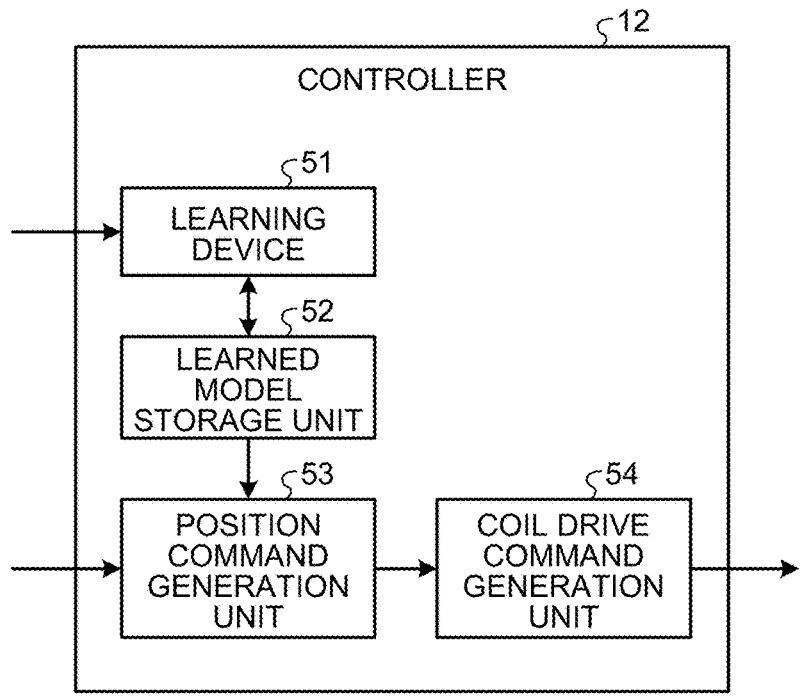
FIG. 8 is a diagram illustrating an exemplary configuration of a controller included in the conveyance system according to a third embodiment.

FIG. 8 is a diagram illustrating an exemplary configuration of the controller 12 included in the conveyance system 2 according to the third embodiment. The controller 12 includes a learning device 51, a learned model storage unit 52, a position command generation unit 53, and a coil drive command generation unit 54.

The learning device 51 learns a relationship between operation information of each of the plurality of carriers 16 included in the conveyance system 2 and the position command that increases the number of conveyance path units 11 that execute the regenerative power supply. The operation information is information indicating a schedule for movement of each of the plurality of carriers 16 on the conveyance path 10. The position command indicates a position to which each carrier 16 is moved. The learning device 51 outputs a learned model which is a result of the learning. The learned model storage unit 52 stores the learned model.

For each of the plurality of carriers 16 included in the conveyance system 2, the position command generation unit 53 generates a position command indicating a position to which the carrier 16 is moved. The position command generation unit 53 reads a learned model from the learned model storage unit 52. The position command generation unit 53 infers a position command that increases the number of conveyance path units 11 that execute the regenerative power supply by inputting the operation information to the learned model. The position command generation unit 53 generates the position command by such inference.

The coil drive command generation unit 54 generates a coil drive command on the basis of the position command. The controller 12 controls the movement of each carrier 16 by outputting the coil drive command to each conveyance path unit 11.

Figure 9:
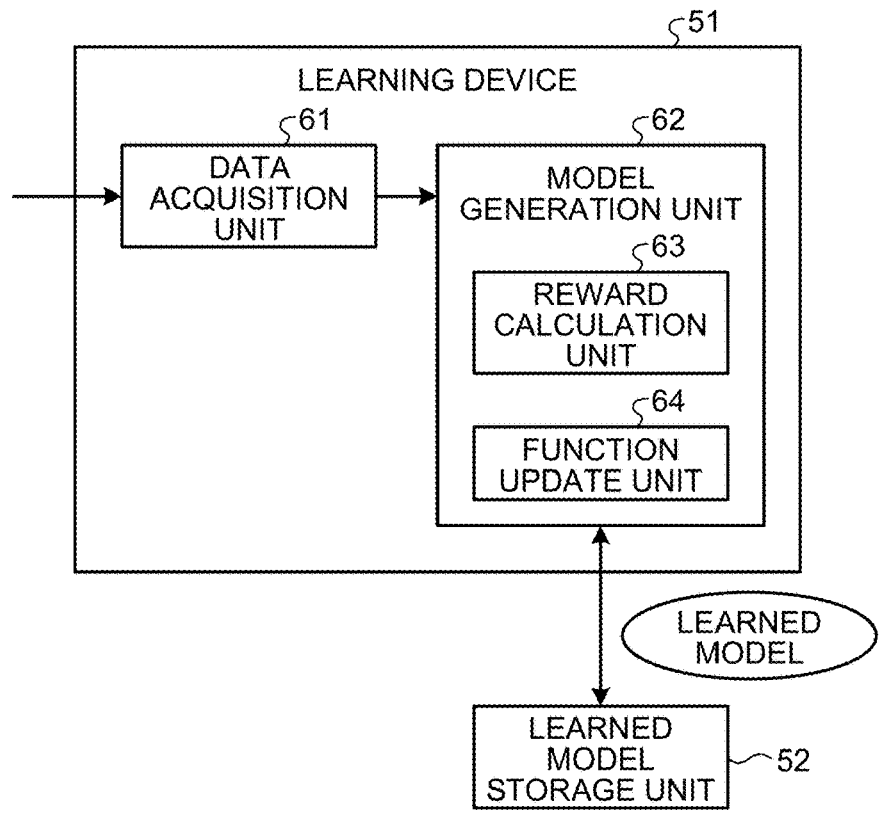
FIG. 9 is a diagram illustrating an exemplary configuration of a learning device included in the controller of the third embodiment.

FIG. 9 is a diagram illustrating an exemplary configuration of the learning device 51 included in the controller 12 of the third embodiment. The learning device 51 includes a data acquisition unit 61 and a model generation unit 62. The data acquisition unit 61 acquires learning data and creates a data set obtained by combining the learning data. The learning data is operation information and a position command. That is, the data acquisition unit 61 acquires learning data including the operation information and the position command.

The model generation unit 62 generates a learned model by using the learning data. The model generation unit 62 generates a learned model to be used for inference of a position command from operation information on the basis of the learning data.

As a learning algorithm used by the model generation unit 62, a known algorithm such as supervised learning, unsupervised learning, or reinforcement learning can be used. As an example, a case will be described where reinforcement learning is applied to a learning algorithm used by the model generation unit 62. Reinforcement learning is learning in which a subject of action as an agent in an environment observes the current state and decides what action to take. The agent gets a reward from the environment by selecting an action, and learns a policy with which a maximum reward is obtained through a series of actions. As representative methods of reinforcement learning, Q-learning, TD-learning, and the like are known. For example, in a case of Q-learning, an action-value table which is a general update formula for an action-value function Q(s,a) is expressed by the following formula (1). The action-value function Q(s,a) represents an action value Q which is a value of an action of selecting an action "a" under an environment "s".

Formula 1:

$$Q(s_t,a_t) \rightarrow Q(s_t,a_t)+\alpha(r_{t+1}+\gamma \max_a Q(s_{t+1},a_t)-Q(s_t,a_t)) \quad (1)$$

In the formula (1), "$s_t$" represents an environment at time "t". "$a_t$" represents an action at time "t". The action "$a_t$" changes the environment to "$s_{t+1}$". "$r_{t+1}$" represents a reward given by the change in the environment. "γ" represents a discount rate. "α" represents a learning coefficient. The operation information is the environment "$s_t$". The position command is the action "$a_t$".

The update formula expressed by the formula (1) increases an action value Q if an action value of best action "a" at time "t+1" is larger than an action value Q of action "a" executed at time "t", and decreases the action value Q if opposite is true. In other words, the action-value function Q(s,a) is updated so that the action value Q of action "a" at time "t" approaches a best action value at time "t+1". Consequently, a best action value in a certain environment is sequentially propagated to action values in the previous environments.

The model generation unit 62 includes a reward calculation unit 63 and a function update unit 64. The reward calculation unit 63 calculates a reward on the basis of the data set. The function update unit 64 updates a function for determining a position command in accordance with the reward calculated by the reward calculation unit 63.

Specifically, the reward calculation unit 63 calculates a reward "r" on the basis of the number of conveyance path units 11 that execute the regenerative power supply in each control cycle. For example, a reference number of conveyance path units 11 which is reference of the number of conveyance path units that execute the regenerative power supply is determined in advance, and the reward calculation unit 63 increases the reward "r" in a case where the number of conveyance path units 11 that execute the regenerative power supply is larger than the reference number. The reward calculation unit 63 increases the reward "r" by giving "1" which is a value of the reward. Note that the value of the reward is not limited to "1". On the other hand, in a case where the number of conveyance path units 11 that execute the regenerative power supply is smaller than the reference number, the reward calculation unit 63 decreases the reward "r". The reward calculation unit 63 decreases the reward "r" by giving "−1" which is a value of the reward. Note that the value of the reward is not limited to "−1". In addition, any number can be set as the reference number. The reference number can be set in consideration of the magnitude of the regenerative power or the generation frequency of the regenerative power, for example, on the basis of the total number of the conveyance path units 11 constituting the conveyance system 2 and the total number of the carriers 16 constituting the conveyance system 2.

The function update unit 64 updates a function which is a model for determining a position command in accordance with the reward calculated by the reward calculation unit 63. The function can be updated in accordance with the data set, for example, by updating the action-value table. The action-value table is a data set in which any action and an action value thereof are stored in association with each other in a form of a table. For example, in the case of Q learning, an action-value function $Q(s_t,a_t)$ expressed by the above formula (1) is used as a function for determining the position command.

Figure 10:
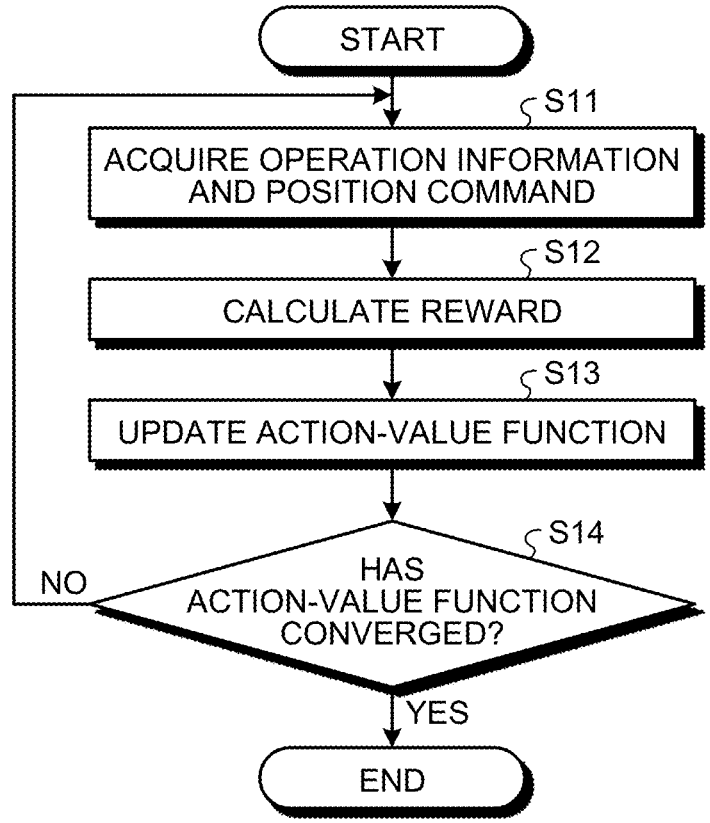
FIG. 10 is a flowchart illustrating a processing procedure of the learning device included in the controller of the third embodiment.

FIG. 10 is a flowchart illustrating a processing procedure of the learning device 51 included in the controller 12 of the third embodiment. A reinforcement learning method of updating the action-value function Q(s,a) will be described with reference to the flowchart of FIG. 10.

In step S11, the learning device 51 acquires operation information and a position command by the data acquisition unit 61. That is, the learning device 51 acquires learning data. The data acquisition unit 61 outputs a data set collectively including the learning data to the model generation unit 62.

In step S12, the learning device 51 calculates a reward by the reward calculation unit 63. The reward calculation unit 63 calculates a reward for a combination of operation information for each carrier 16 and a position command for each carrier 16. The reward calculation unit 63 increases or decreases the reward on the basis of the number of conveyance path units 11 that execute the regenerative power supply for each control cycle.

In step S13, the learning device 51 updates the action-value function by the function update unit 64. The function update unit 64 updates the action-value function Q(s,a) on the basis of the reward calculated in step S12. The learning device 51 updates the action-value function $Q(s_t,a_t)$ stored in the learned model storage unit 52.

In step S14, the learning device 51 determines by the function update unit 64 whether the action-value function Q(s,a) has converged. The function update unit 64 determines that the action-value function Q(s,a) has converged when the action-value function Q(s,a) is no longer updated in step S13.

If the function update unit 64 determines that the action-value function Q(s,a) has not converged (step S14, No), the learning device 51 returns the procedure to step S11. On the other hand, if the function update unit 64 determines that the action-value function Q(s,a) has converged (step S14, Yes), the learning device 51 ends the processes in accordance with the procedure illustrated in FIG. 10. Note that the learning device 51 may continue learning by returning the procedure from step S13 to step S11 without making the determination in step S14. The learned model storage unit 52 stores a learned model which is the generated action-value function Q(s,a).

In the third embodiment, the case has been described where reinforcement learning is applied to the learning algorithm used by the learning device 51, but learning other than reinforcement learning may be applied to the learning algorithm. The learning device 51 may execute machine learning by using a known learning algorithm other than reinforcement learning, for example, a learning algorithm such as deep learning, a neural network, genetic programming, inductive logic programming, or a support vector machine.

The learning device 51 illustrated in FIGS. 8 and 9 is a device built in the controller 12. The learning device 51 may be a device outside the controller 12. The learning device 51 which is a device outside the controller 12 constitutes the conveyance system 2. The learning device 51 may be a device connectable to the controller 12 via a network. The learning device 51 may be a device present on a cloud server.

The learning device 51 may learn the position command that increases the number of conveyance path units 11 that execute the regenerative power supply in accordance with a data set created for a plurality of conveyance systems 2. The learning device 51 may acquire learning data from a plurality of conveyance systems 2 used in the same place, or may acquire learning data from a plurality of conveyance systems 2 used in places different from each other. The learning data may be collected from a plurality of conveyance systems 2 that operate independently from each other in a plurality of places. After the collection of the learning data from such a plurality of conveyance systems 2 is started, a new conveyance system 2 may be added as a target from which the learning data is collected. In addition, after the collection of the learning data from the plurality of conveyance systems 2 is started, some of the plurality of conveyance systems 2 may be excluded from targets from which the learning data is collected.

The learning device 51 that has learned one conveyance system 2 may learn another conveyance system 2 other than the one conveyance system 2. The learning device 51 that performs learning for the another conveyance system 2 can update the learned model by relearning in the another conveyance system 2.

Figure 11:
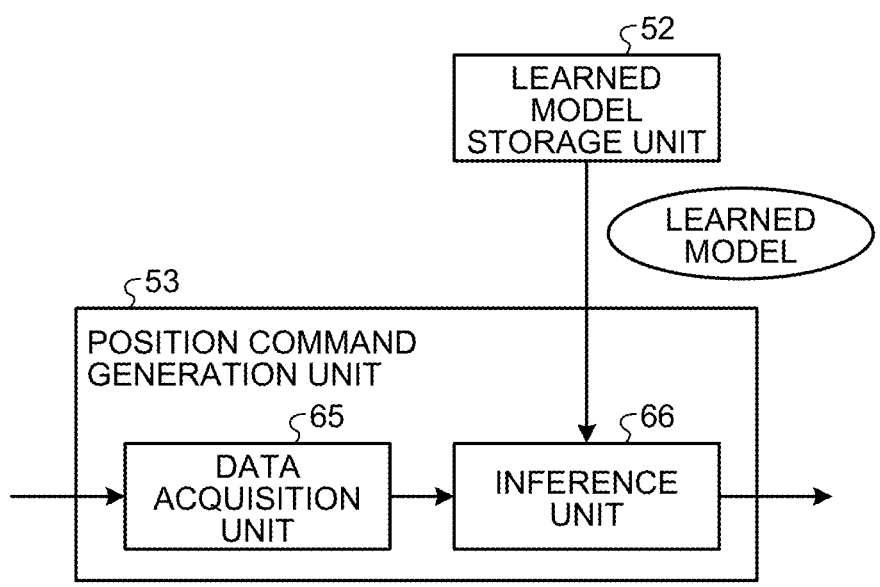
FIG. 11 is a diagram illustrating an exemplary configuration of a position command generation unit included in the controller of the third embodiment.

FIG. 11 is a diagram illustrating an exemplary configuration of the position command generation unit 53 included in the controller 12 of the third embodiment. The position command generation unit 53 has a function as an inference device that infers a position command from operation information. The position command generation unit 53 includes a data acquisition unit 65 and an inference unit 66.

The data acquisition unit 65 acquires inference data. The inference data is operation information regarding each of the plurality of carriers 16 included in the conveyance system 2. The inference unit 66 reads the learned model generated by the learning device 51 from the learned model storage unit 52. The inference unit 66 infers a position command by inputting the inference data to the learned model. The inference unit 66 outputs the position command which is a result of the inference to the coil drive command generation unit 54. The coil drive command generation unit 54 generates a coil drive command on the basis of the position command.

Figure 12:
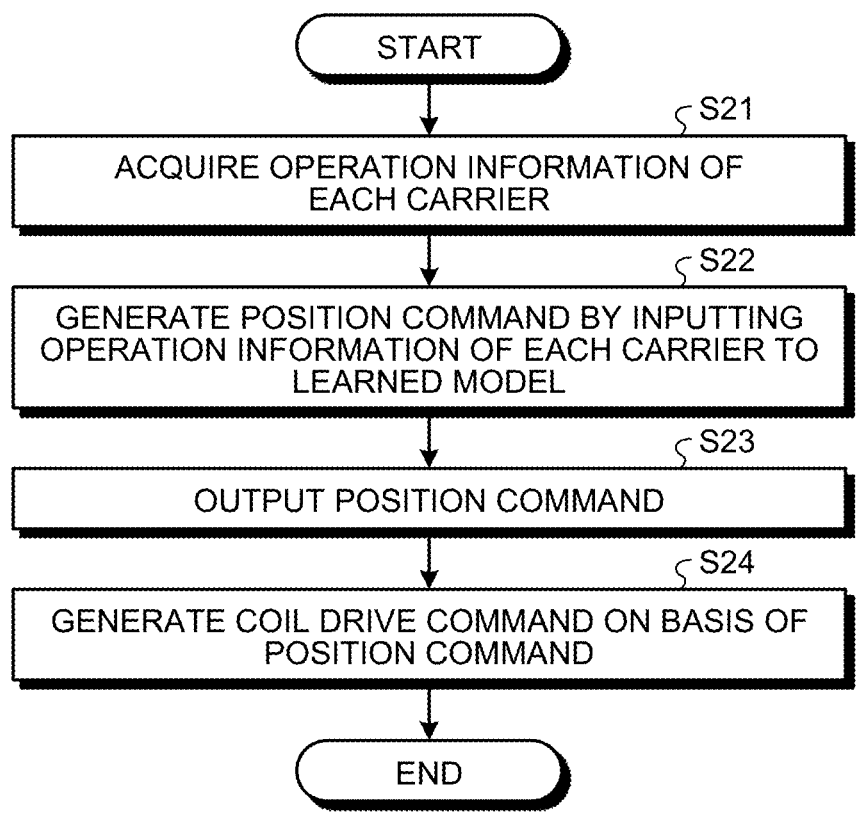
FIG. 12 is a flowchart illustrating processing procedures of the position command generation unit and a coil drive command generation unit included in the controller of the third embodiment.

FIG. 12 is a flowchart illustrating processing procedures of the position command generation unit 53 and the coil drive command generation unit 54 included in the controller 12 of the third embodiment.

In step S21, the position command generation unit 53 acquires the operation information of each carrier 16 by the data acquisition unit 65. The data acquisition unit 65 outputs the acquired operation information to the inference unit 66.

In step S22, the position command generation unit 53 generates a position command by inputting the operation information of each carrier 16 to the learned model in the inference unit 66. In step S23, the inference unit 66 outputs the position command to the coil drive command generation unit 54. In step S24, the coil drive command generation unit 54 generates a coil drive command on the basis of the position command. Thus, the position command generation unit 53 and the coil drive command generation unit 54 end the processes in accordance with the procedures illustrated in FIG. 12. The controller 12 transmits the coil drive command generated by the coil drive command generation unit 54 to each conveyance path unit 11 via the data communication line 14.

According to the third embodiment, the conveyance system 2 includes the learning device 51 and the position command generation unit 53 which is an inference device, so that it is possible to derive the position command that increases the number of conveyance path units 11 that execute the regenerative power supply. Consequently, the conveyance system 2 can appropriately process regenerative power.

The example has been described above in which machine learning is applied to the generation of the position command in the conveyance system 2 according to the second embodiment. Machine learning described in the third embodiment may be applied to the generation of the position command in a case where the regenerative power supply is executed in the conveyance path units 11 that the carrier 16 has not entered as in the first embodiment. The conveyance system 2 may generate the position command by a method other than machine learning.

Next, hardware that implements the controller 12 according to the first to third embodiments will be described. The controller 12 is implemented by a processing circuitry. The processing circuitry may be a circuit in which a processor executes software, or may be a dedicated circuit.

Figure 13:
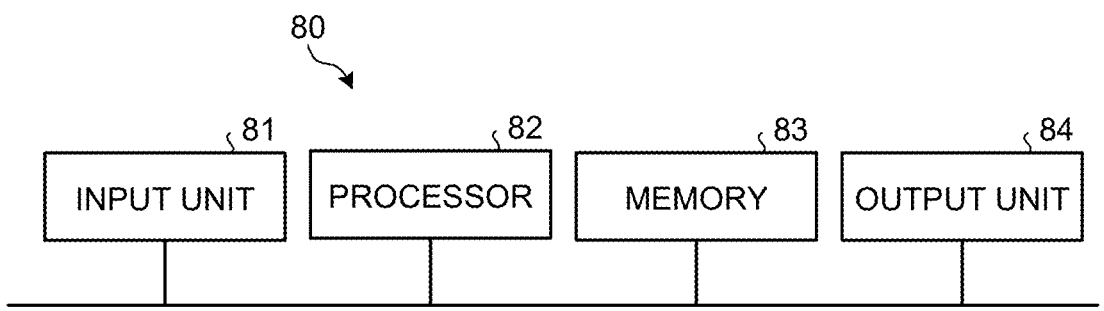
FIG. 13 is a diagram illustrating an exemplary configuration of a control circuit according to the first to third embodiments.

In a case where the processing circuitry is implemented by software, the processing circuitry is, for example, a control circuit illustrated in FIG. 13. FIG. 13 is a diagram illustrating an exemplary configuration of a control circuit 80 according to the first to third embodiments. The control circuit 80 includes an input unit 81, a processor 82, a memory 83, and an output unit 84. The input unit 81 is an interface circuit that receives data input from the outside of the control circuit 80 and gives the data to the processor 82. The output unit 84 is an interface circuit that sends data from the processor 82 or the memory 83 to the outside of the control circuit 80.

In a case where the processing circuitry is the control circuit 80 illustrated in FIG. 13, the controller 12 is implemented by software, firmware, or a combination of software and firmware. The software or the firmware is described as a program and stored in the memory 83. The processing circuitry implements functions of the controller 12 by the processor 82 reading and executing a program stored in the memory 83. That is, the processing circuitry includes the memory 83 for storing a program with which a process of the controller 12 is executed as a result. It can also be said that these programs cause a computer to execute procedures and methods of the controller 12.

The processor 82 is a CPU. The processor 82 may be a central processing device, a processing device, an arithmetic device, a microprocessor, a microcomputer, a processor, or a DSP. The memory 83 corresponds to, for example, a non-volatile or volatile semiconductor memory such as a random access memory (RAM), a read only memory (ROM), a flash memory, an erasable programmable read only memory (EPROM), or an electrically erasable programmable read only memory (EEPROM (registered trademark)), a magnetic disk, a flexible disk, an optical disk, a compact disc, a mini disk, or a digital versatile disk (DVD).

Figure 14:
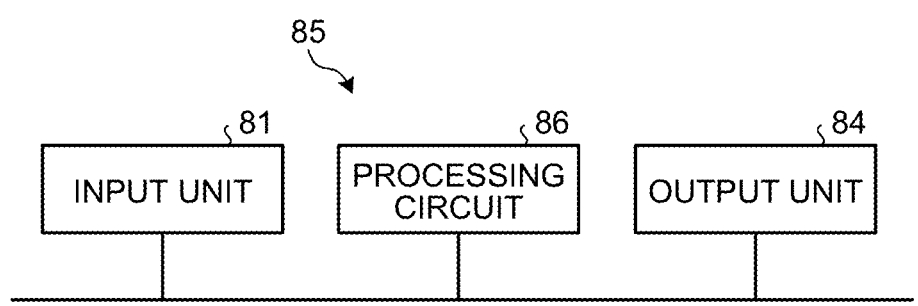
FIG. 14 is a diagram illustrating an exemplary configuration of a hardware circuit as a dedicated circuit according to the first to third embodiments.

FIG. 13 is an example of hardware in a case where the controller 12 is implemented by the processor 82 and the memory 83 for general-purpose use, but the controller 12 may be implemented by a dedicated hardware circuit. FIG. 14 is a diagram illustrating an exemplary configuration of a hardware circuit 85 as a dedicated circuit according to the first to third embodiments.

The hardware circuit 85 as a dedicated circuit includes the input unit 81, the output unit 84, and a processing circuit 86. The processing circuit 86 is a single circuit, a composite circuit, a programmed processor, a parallel programmed processor, an application specific integrated circuit (ASIC), a field programmable gate array (FPGA), or a circuit obtained by combination thereof. The functions of the controller 12 may be separately implemented by the processing circuit 86, or the functions may be collectively implemented by the processing circuit 86. The controller 12 may be implemented by combining the control circuit 80 and the hardware circuit 85.

The configurations described in the respective embodiments above are merely examples of the content of the present disclosure. The configurations of the respective embodiments can be combined with other known technology. The configurations of the respective embodiments may be appropriately combined. Part of the configurations of the respective embodiments can be omitted or modified without departing from the gist of the present disclosure.

REFERENCE SIGNS LIST 1, 2 conveyance system; 10 conveyance path; 11, 11A, 11B, 11C, 11D, 11E, 11F, 11G, 11H conveyance path unit; 12 controller; 13 DC power supply; 14 data communication line; 15 DC power supply bus; 16, 16A, 16B, 16C carrier; 17A, 17B arrow; 20 coil; 21 inverter circuit; 22 current sensor; 23 capacitor; 24 current controller; 25 linear scale; 26 position sensor; 27, 82 processor; 28 communication slave station; 31 P bus; 32 N bus; 33 bus voltage detection unit; 34 temperature sensor; 40, 41 permanent magnet; 51 learning device; 52 learned model storage unit; 53 position command generation unit; 54 coil drive command generation unit; 61, 65 data acquisition unit; 62 model generation unit; 63 reward calculation unit; 64 function update unit; 66 inference unit; 80 control circuit; 81 input unit; 83 memory; 84 output unit; 85 hardware circuit; 86 processing circuit.

The invention claimed is:

1. A conveyance system comprising:
a plurality of conveyance path units constituting a conveyance path on which a conveyance body moves and stops for entry into either one or adjacent ones of the conveyance path units, the conveyance path units being each connected to a common direct-current bus, wherein
a conveyance path unit that is each of the plurality of conveyance path units includes a driver to be supplied with power from the direct-current bus to thereby generate motive power for moving the conveyance body, and
among the plurality of conveyance path units, one or at least one of two or more of the conveyance path units which the conveyance body has not entered executes regenerative power supply for supplying the driver with regenerative power generated in the plurality of conveyance path units.

2. A conveyance system comprising:
a plurality of conveyance path units constituting a conveyance path on which a conveyance body moves, the conveyance path units being each connected to a common direct-current bus, wherein
a conveyance path unit that is each of the plurality of conveyance path units includes a driver to be supplied with power from the direct-current bus to thereby generate motive power for moving the conveyance body, and
among the plurality of conveyance path units, one or at least one of two or more of the conveyance path units which the conveyance body has not entered executes regenerative power supply for supplying the driver with regenerative power generated in the plurality of conveyance path units,
the conveyance path units each include a bus voltage detector to detect a bus voltage that is a voltage of the direct-current bus, and
among the plurality of conveyance path units, one or at least one of two or more of the plurality of conveyance path units which the conveyance body has not entered executes the regenerative power supply when the bus voltage becomes equal to or higher than a preset first voltage threshold.

3. The conveyance system according to claim 2, wherein when the bus voltage becomes equal to or lower than a second voltage threshold smaller than the first voltage threshold, the conveyance path units that are executing the regenerative power supply stop the regenerative power supply.

4. The conveyance system according to claim 3, wherein at least one of the first voltage threshold and the second voltage threshold is individually set for each of a plurality of conveyance path units.

5. The conveyance system according to claim 2, wherein when the conveyance body enters the conveyance path unit that is executing the regenerative power supply, the conveyance path unit stops executing the regenerative power supply.

6. The conveyance system according to claim 2, wherein when power supplied to the driver of the conveyance path unit that is executing the regenerative power supply exceeds a preset power threshold, the conveyance path unit stops executing the regenerative power supply.

7. The conveyance system according to claim 6, wherein the power threshold is individually set for each of a plurality of conveyance path units.

8. The conveyance system according to claim 2, wherein
the conveyance path is provided with a sensor to sense a position of the conveyance body, and
among the plurality of conveyance path units, the conveyance path unit identified by a result of sensing by the sensor as a conveyance path unit which the conveyance body has not entered executes the regenerative power supply.

9. A conveyance system comprising:
a plurality of conveyance path units constituting a conveyance path on which a conveyance body moves, the conveyance path units being each connected to a common direct-current bus, wherein
a conveyance path unit that is each of the plurality of conveyance path units includes a driver to be supplied with power from the direct-current bus to thereby generate motive power for moving the conveyance body, and
among the plurality of conveyance path units, one or at least one of two or more of the conveyance path units which the conveyance body has not entered executes regenerative power supply for supplying the driver with regenerative power generated in the plurality of conveyance path units
the system further comprises
a controller to control each of the plurality of conveyance path units, wherein
the controller determines the conveyance path unit to execute the regenerative power supply, on a basis of position information indicating a position of the conveyance body on the conveyance path.

10. The conveyance system according to claim 9, wherein
the plurality of conveyance path units includes a first conveyance path unit and a second conveyance path unit, the first conveyance unit being the conveyance path unit on which the conveyance body is present, the second conveyance path unit being one or two or more of the conveyance path units located adjacent to the first conveyance path unit in the conveyance path, and
the controller
excludes the first conveyance path unit and the second conveyance path from the conveyance path units to execute the regenerative power supply.

11. The conveyance system according to claim 10, wherein at least one of the number of the second conveyance path units located adjacent to the first conveyance path unit in a first direction along the conveyance path and the number of the second conveyance path units located adjacent to the first conveyance path unit in a second direction along the conveyance path and opposite to the first direction is calculated on a basis of a speed of the conveyance body on the conveyance path.

12. The conveyance system according to claim 9, wherein
the plurality of conveyance path units includes a first conveyance path unit and a second conveyance path unit, the first conveyance unit being the conveyance path unit on which the conveyance body is present, the second conveyance path unit being one or two or more of the conveyance path units located adjacent to the first conveyance path unit in the conveyance path in a travelling direction of the conveyance body, and
the controller
excludes the first conveyance path unit and the second conveyance path unit from the conveyance path units to execute the regenerative power supply.

13. The conveyance system according to claim 10, wherein the number of the second conveyance path units is calculated on a basis of a speed of the conveyance body on the conveyance path.

14. The conveyance system according to claim 9, wherein
the conveyance path units each include a temperature sensor, and
the controller determines the conveyance path units to execute the regenerative power supply, on a basis of a result of detection of temperature by the temperature sensor of each of the plurality of conveyance path units.

15. The conveyance system according to claim 2, wherein
the conveyance path units each include an inverter circuit to supply the driver with power having undergone power conversion by switching, and
the inverter circuit operates at a switching frequency lower than a switching frequency set when the motive power is applied to the conveyance body in the regenerative power supply.

16. A conveyance system comprising:
a plurality of conveyance path units constituting a conveyance path on which a conveyance body moves, the conveyance path units being each connected to a common direct-current bus, wherein
a conveyance path unit that is each of the plurality of conveyance path units includes a driver to be supplied with power from the direct-current bus to thereby generate motive power for moving the conveyance body, and
among the plurality of conveyance path units, one or at least one of two or more of the conveyance path units which the conveyance body has not entered executes regenerative power supply for supplying the driver with regenerative power generated in the plurality of conveyance path units,
the conveyance body includes a plurality of conveyance bodies, and the conveyance system comprises:
a learning device including
data acquisition circuitry to acquire learning data including operation information and a position command, the operation information being information indicating a schedule for movement of each of the conveyance bodies on the conveyance path, the position command indicating, for each of a plurality of the conveyance bodies, a position to which the conveyance body is moved, and
model generation circuitry that generates, on a basis of the learning data, a learned model to be used for inference of the position command from the operation information.

17. The conveyance system according to claim 2, wherein the conveyance body includes a plurality of conveyance bodies, and the conveyance system comprises:
- a controller to control each of the plurality of conveyance path units, the controller including position command generation circuitry to generate a position command indicating, for each of a plurality of the conveyance bodies, a position to which the conveyance body is moved, wherein
- the position command generation circuitry includes:
- data acquisition circuitry to acquire operation information that is information indicating a schedule for movement of each of the conveyance bodies on the conveyance path; and
- inference circuitry to infer a position command by inputting the operation information to a learned model for inferring, from the operation information, the position command indicating, for each of a plurality of the conveyance bodies, a position to which the conveyance body is moved.

18. The conveyance system according to claim 2, comprising:
- the conveyance body that is one or plural in number, wherein
- the driver includes a coil to be supplied with power from the direct-current bus to thereby generate an electromagnetic force that is the motive power, and
- the conveyance body is provided with a permanent magnet.

19. The conveyance system according to claim 12, wherein the number of the second conveyance path units is calculated on a basis of a speed of the conveyance body on the conveyance path.

* * * * *